United States Patent Office 3,348,474
Patented Oct. 24, 1967

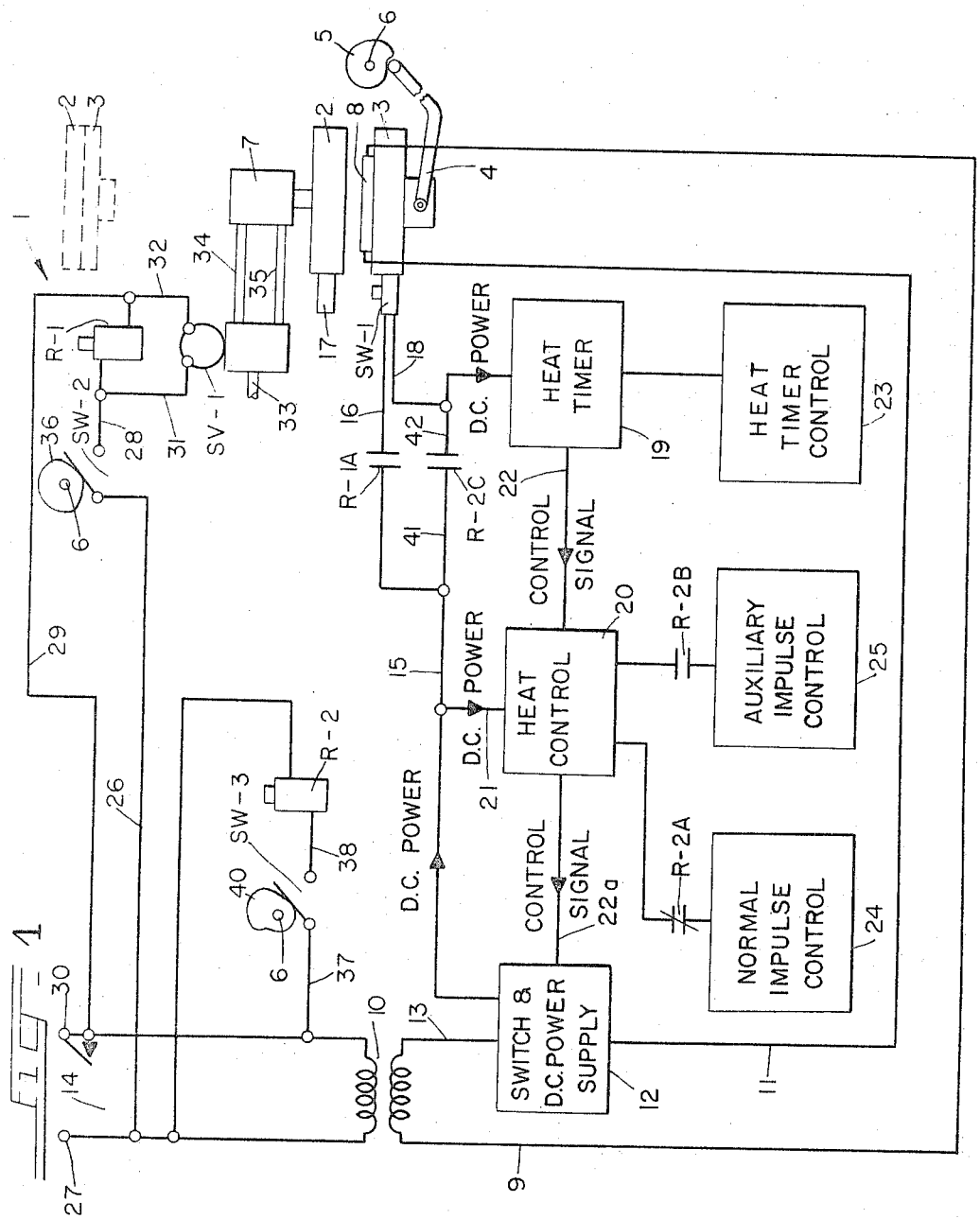

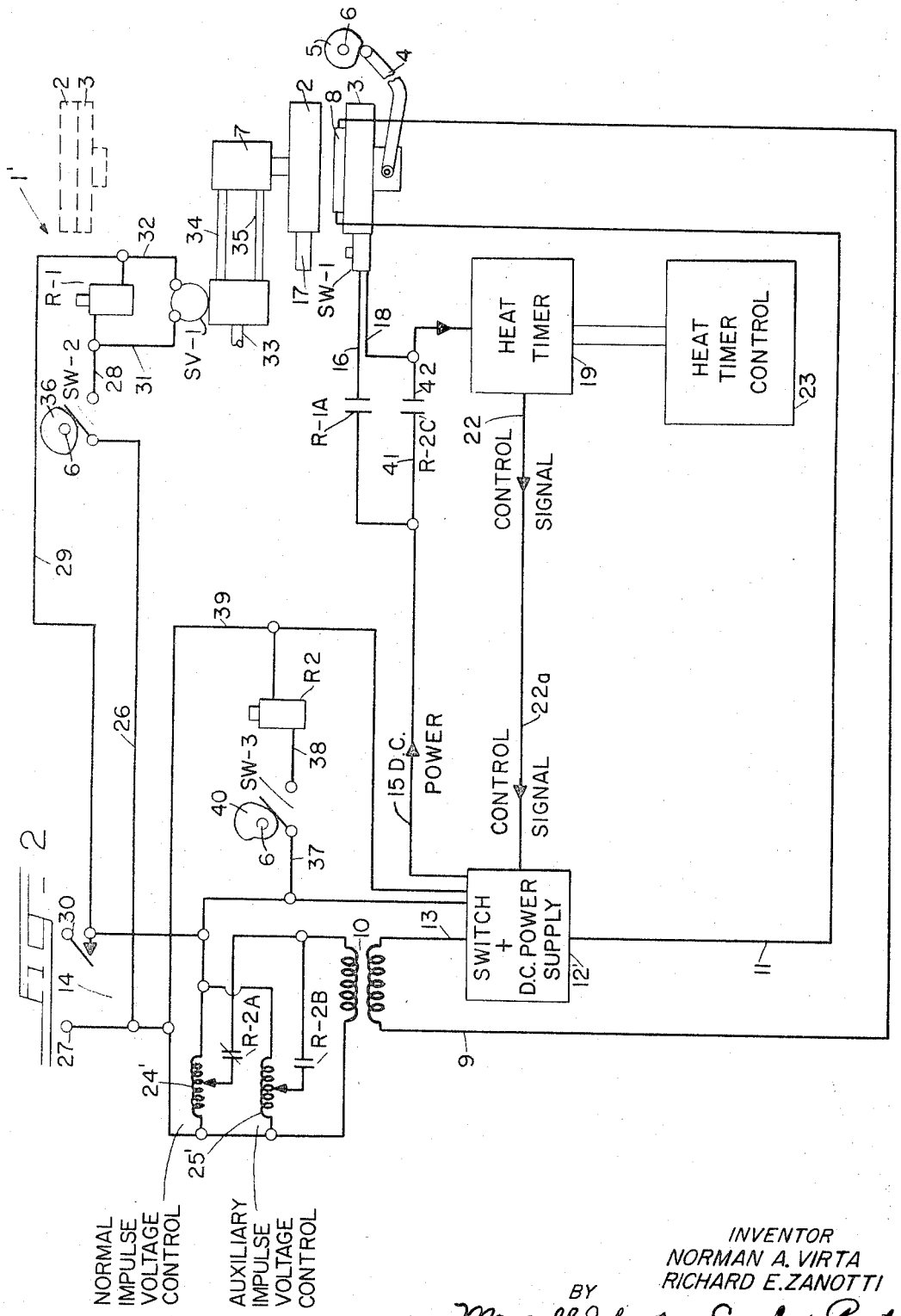

3,348,474
HEATSEALING MACHINES
Norman A. Virta, Mount Prospect, and Richard E. Zanotti, Harwood Heights, Ill., assignors to Triangle Package Machinery Company, Chicago, Ill., a corporation of Illinois
Filed Feb. 2, 1965, Ser. No. 430,035
14 Claims. (Cl. 100—93)

ABSTRACT OF THE DISCLOSURE

A heatsealing machine wherein heating of the heating element is less during a "skip" cycle than during a "sealing" cycle.

---

This invention relates to heatsealing machines, and, more particularly, to machines which are particularly well adapted for automatic operation in the heatsealing of thermoplastic bags, and the like.

It is a primary object of the present invention to afford a novel machine for heatsealing thermoplastic sheet material, wherein, during the sealing operation, the sheets or coatings thereon are melted or plasticized by the application of heat and then permitted to cool while clamped in face-to-face relation to each other to thereby afford a strong fluid-tight bond between the thus engaged portions of the sheets. Examples of such plastic sheet materials are polyethylene, polypropylene, polyvinylidene chloride, and the like, all of which are readily available on the market.

Machines for heatsealing thermoplastic sheet materials have been heretofore known in the art. In general, the normal operation of such machines has commonly been that the layers of sheet material to be sealed together have been disposed between suitable clamping jaws embodying a heat element, the portions of the sheet material to be sealed being first clamped together between the jaws, then having plasticizing heat applied thereto by the heater element, and then remaining clamped between the jaws during a cooling period so that, when the jaws were subsequently separated, the portions of the sheet material which had been clamped together thereby are firmly bonded together. In the operation of such machines, the heater elements thereof are alternately heated to a temperature sufficiently high to cause the desired plasticizing of the sheet material or of the coating thereon, and then cooled to a temperature sufficiently low to permit the plastized portion of the sheet material to "set" during each cycle of operation. During normal operations of such machines, wherein a heatsealing operation on the sheet material occurs during each successive cycle of operation of the machine, little difficulty is encountered in maintaining the temperature of the heater element within the limits necessary to permit it to cool to a temperature sufficiently low to permit "setting" of the plasticized sheet material, and again be heated, during the next cycle of operation, to a temperature sufficient to cause the necessary plasticizing of the sheet material.

However, when operating at common commercial speeds, such as, for example, in excess of thiry or forty sealing operations per minute, this temperature range is normally relatively limited. Overheating of the heating element will cause the same to prematurely burn out, and thus shorten the life thereof, and, also, will overheat the sheet material clamped between the jaws, thus causing a defective bond, or even actual burning through or melting through of the sheet material. Underheating of the heater element will, of course, not produce sufficient plastcizing of the sheet material to afford an effective bond between the adjacent sheets.

It is also essential in the operation of heatsealing machines of the aforementioned general type that the plasticized sheet material be permitted to cool to a sufficiently low temperature that "setting" thereof occurs while the adjacent sheets are firmly engaged with each other so that a strong bond is afforded therebetween. Therefore, normally such cooling is effected while the sheets are pressed together by the damping jaws. In many machines of the general type to which the present invention pertains, a coolant, such as, for example, a suitable refrigerant liquid is fed through the jaws of the machine adjacent to the heater element to thereby accelerate the cooling of the jaws and the heater element after a heat-applying operation thereof.

During the operation of such machines, it is not uncommon for the machines to pass through what are known as "skip" cycles of operation, wherein a heatsealing operation on the sheet material is not accomplished. The common reasons for such "skip" cycles of operation is that the filling machine which is used in conjunction with the bag making machine is not ready to supply product to the bag and, therefore, by means of an automatic control circuit the sealing jaws are not allowed to close so that an empty bag will not be made.

When more than one such skip cycle is encountered in heatsealing machines of the type heretofore known in the art, excessive cooling of the heater element prior to the next heating cycle of operation thereof has been common, so that during the next heating cycle of operation of the heater element the temperature thereof is not raised to the proper temperature for effecting a good heatseal of the sheet material so that a defective bond between the sheets of material may result. These difficulties are particularly acute in heatsealing machines heretofore known in the art, when several successive "skip" cycles of operation are encountered, the heater elements of such machines cooling to such a low temperature during such a prolonged period of time that the heater element will not produce satisfactory seals until it has been operated three or four cycles. The bags produced during this period will not be properly sealed. It is an important object of the present invention to enable such difficulties to be overcome in a novel and expeditious manner.

Another object of the present invention is to enable the temperature of the heater elements of machines of the aforementioned type to be effectively controlled in a novel and expeditious manner.

Another object is to enable the temperatures of the heater elements of such machines to be maintained within the desired temperature limits in a novel and expeditious manner.

Yet another object of the present invention is to prevent excessive cooling of the heater elements of machines of the aforementioned type between heat sealing operations thereof.

A further object is to prevent such excessive cooling of the heater elements of such machines between heatsealing operations thereof even during prolonged periods of time during the operation of such machines, such as, for example, during periods of time resulting from several successive "skip" cycles of operations, wherein no heat-sealing of sheet material takes place.

Another object of the present invention is to afford a novel machine of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a diagrammatic illustration of a machine embodying the principles of the present invention; and FIG. 2 is a diagrammatic illustration of a modified form of the invention.

A machine 1, embodying the principles of the present invention, is illustrated diagrammatically in FIG. 1 of the drawings to illustrate the preferred embodiment of the present invention.

The machine 1 includes a pair of jaws 2 and 3 which may be reciprocated between a raised position, shown in broken lines in FIG. 1, and a lowered position, shown in solid lines in FIG. 1, by suitable drive mechanism 4 actuated by a cam 5 mounted on a drive shaft 6 of the machine 1. During each cycle of the machine 1 the drive shaft 6 rotates one revolution to thereby cause the jaws 2 and 3 to move through one complete reciprocation between the aforementioned raised and fully lowered positions thereof.

The jaws 2 and 3 are disposed in spaced relation to each other at the bottom of their stroke, and remain in spaced relation to each other during upward movement thereof from the bottom to the top of their stroke. At the top of their stroke, the jaws 2 and 3 are moved into closed position relative to each other by suitable actuating mechanism, such as an air cylinder 7, operatively connected thereto and controlled by a solenoid valve SV-1. During the downward movement of the jaws 2 and 3, they remain in closed position to the bottom of their stroke, at which time they are moved into their aforementioned open position by actuation of the air cylinder 7.

With the jaws 2 and 3 arranged and moving in this manner, they are operable to seal thermoplastic bags, and the like, moving downwardly through the machine 1, the jaws 2 and 3 being effective to clamp the bags therebetween at the top of the jaw stroke, and then move downwardly with the bags, in gripping relation thereto, during the downward stroke of the jaws 2 and 3. A heater element 8 is embodied on the upper face of the jaw 3 in position to engage the sheet material gripped between the jaws 2 and 3 during the downward stroke thereof, the temperature of the heating element 8 being controlled in a manner which will be discussed in greater detail presently.

The machine 1 is of a type which is particularly well adapted for automatically forming and closing bags, and the like, from two layers of thermoplastic sheet material fed through the machine in face-to-face relation to each other. Machines of the general type of the machine 1, and over which the machine 1 constitutes an improvement, such as, for example, machines of the type disclosed in United States Letters Patent 2,460,460, issued to N. Langer on Feb. 1, 1949, have been heretofore known in the art. The two layers of thermoplastic material may be in any suitable form, but preferably comprise the opposite sides of a tubular strip of material fed lengthwise downwardly through the machine 1. The feeding of the sheet material may be accomplished in any suitable manner, including hand feeding thereof.

In the operation of such a machine, as the tubular strip of thermoplastic material moves downwardly the jaws 2 and 3 grip the sheet material therebetween laterally across the entire width thereof and move downwardly therewith. During this downward movement of the jaws 2 and 3, the temperature of the heater element 8 is raised to a temperature effective to plasticize the thermoplastic material, and the heater element 8 and jaws 2 and 3 are then cooled to permit the compressed portions of the two layers of sheet material to bond together. This forms the bottom of a bag.

The jaws 2 and 3 are then moved into open position and moved upwardly along the tubular sheet. During this upward movement of the jaws 2 and 3 the products to be packaged in the sheet material may be fed downwardly through the tube into the bottom thereof.

At the top of their stroke, in a normal operation of the machine 1, the jaws 2 and 3 again close on the tube of sheet material, above the product which has been fed into the tube, and move downwardly through another heatsealing operation to thereby simultaneously form a sealed top for the one bag and a sealed bottom for the next succeeding bag to be filled.

At the bottom of the stroke of the jaws 2 and 3 the sealed sheet material between the top of the first mentioned bag and the bottom of the second mentioned bag may be severed by suitable mechanism, such as, for example, a cut-off wire, or a knife, not shown, to thereby separate the sealed first-mentioned bag from the remainder of the tubular plastic material, leaving the bottom edge portion of the tubular plastic material sealed together to form the bottom of the second aforementioned bag. This operation may be repeated during each normal cycle of the machine 1.

It will be remembered that in machines of the type for which the present invention is particularly well adapted, "skip" cycles of the machine may occur, wherein no heatsealing operation is performed on the sheet material, in the event that the filling machine is not ready to feed product into the next bag to be sealed at the top. When this occurs in the operation of the machine 1, a special heating cycle of operation of the heater element 8 is effected during each such "skip" cycle to thereby maintain the temperature of the heater element 8 at such a level that during the first succeeding normal operation of the machine 1, a proper sealing operation will be performed. The novel structure and mode of operation by which this is accomplished will be discussed in greater detail hereinafter.

The heater element 8 may be any suitable type of heater element such as, for example, a Nichrome ribbon which may be heated by the passage of electrical current therethrough. One end of the heater element 8 is connected by an electrical conductor 9 to one side of the secondary of a transformer 10, the other end of the heater element 8 being connected by a conductor 11, a control unit 12, and a conductor 13, to the other side of the secondary of the transformer 10. The primary of the transformer 10 may be connected to a suitable source of electric power 14, such as, for example, the usual 230 volt, alternating current wall sockets or outlets, not shown, to be found in factory buildings, and the like.

Another conductor 15 which affords a direct current power line has one end connected to the control unit 12, suitable means such as a rectifier, not shown, being embodied in the control unit 12 between the conductors 11 and 13, and the conductor 15 to convert the current flowing from the control unit 12 to the conductor 15 to direct current. The other end of the conductor 15 is connected to one side of the normally open contacts R-1A of a relay R-1, the other side of the contacts R-1A being connected by a conductor 16 to one side of a normally open switch SW-1 mounted on the jaw 3 and closable by an abutment member 17 on the jaw 2, when the jaws 2 and 3 are disposed in closed position relative to each other. The other side of the switch SW-1 is connected by a conductor 18 to a timer unit 19, which may be of any suitable type readily available on the market.

A heat control unit 20 is connected by conductor 21 to the direct current power line 15. Heat control 20 controls the time period that switch 12 is conductive during each one-half cycle of alternating current that passes through it during the time that the timer control 19 is sending a control signal to said heat control 20, this type of alternating current control being known as "phase control." The control signal, which passes from the heat control 20 to the switch 12 through the conductor 22a, is operative only during the time that the control signal passes from the timer 19 into the heat control 20 through the conductor 22. Thus, the heater element 8 receives pulses of current through the switch 12, the duration of each pulse being a controlled fraction of one-half cycle of alternating current being controlled by the heat control 20, and the total time that such pulses are sent to the heater element 8 being controlled by the timer 19.

A suitable control unit, such as a potentiometer 23 is operatively connected to the heat timer 19 for adjusting the length of operation thereof. Another suitable control unit, such as a potentiometer 24 is connected through normally closed relay contacts R–2A to the heat control unit 20, the potentiometer 24 affording adjustment of the heat control unit 20 during normal operation of the machine 1 for controlling the pulse length of the current impulses flowing through the heat element 8. Another suitable control unit such as a potentiometer 25 is connected through normally open relay contact R–2B to the heat control unit 20 for a purpose which will be discussed in greater detail presently.

One side of a normally open switch SW–2 is connected by a conductor 26 to one side 27 of the source of power 14. The other side of the switch SW–2 is connected by a conductor 28 to one side of the winding of the relay R–1 the other side of the winding thereof being connected by a conductor 29 to the other side 30 of the source of power 14. The winding of the solenoid valve SV–1 is connected by conductors 31 and 32 to the conductors 28 and 29, respectively, in parallel to the relay R–1 so that the switch SW–2 controls the energization of both the relay R–1 and the solenoid valve SV–1.

The inlet port of the solenoid valve SV–1 is connected by a suitable conduit 33 to a suitable source of working fluid such as, for example, an air compressor, not shown; one outlet port of the solenoid valve SV–1 is connected by a suitable conduit 34 to one end of the air cylinder 7; and the other outlet port of the solenoid valve SV–1 is connected by a suitable conduit 35 to the other end of the air cylinder 7.

All of the aforementioned structure of the machine 1, with the exception of the relay contacts R–2A, R–2B, and the potentiometer 25 are well known in the art and have been embodied in machines of the general type of the machine 1, the machine 1 including additional structure, including the aforementioned relay contacts R–2A and R–2B and the potentiometer 25, constituted and arranged in a novel and expeditious manner effective to afford a novel structure and a novel mode of operation.

The portion of the machine 1 thus far described constitutes the structure utilized in a normal operation of the machine 1. In such an operation, assuming that the jaws 2 and 3 are disposed at the bottom of their stroke at the commencement of a normal cycle of operation of the machine 1, the jaws 2 and 3, at that time are held in open position by the air cylinder 7, the switch SW–2 being open so that the solenoid valve SV–1 is deenergized to thereby connect the conduits 33 and 35, and disconnect the conduits 33 and 34. During operation of the machine 1, the rotation of the drive shaft 6 is in a counterclockwise direction, as viewed in FIG. 1, and the shape of the cam 5 is such that during the first 140 degrees rotation thereof the jaws 2 and 3 are moved upwardly into fully raised position, and during the remaining 220 degrees rotation of the cam 5 the jaws 2 and 3 are moved downwardly into fully lowered position. Another cam 36 is mounted on the drive shaft 6 for rotation therewith, and, during each cycle of operation of the machine 1, the cam 36 is operable at the end of the first 140 degrees rotation of the drive shaft 6 to close the switch SW–2 and to hold it closed during the remaining 220 degrees rotation of the drive shaft 6.

Closing of the switch SW–2 energizes the solenoid valve SV–1 and the relay R–1. Energization of the solenoid valve SV–1 causes the conduits 33 and 35 to be disconnected, and the conduits 33 and 34 to be connected to thereby actuate the air cylinder 7 and close the jaws 2 and 3. The closing of the jaws 2 and 3 closes the switch SW–1 to thereby start the timer 19 in operation, the normally open relay contacts R–1A having been closed by the closing of the switch SW–2 and the consequent energization of the relay R–1. Starting of the timer 19 actuates the aforementioned switches, not shown, in the control unit 12 to thereby feed electric current from the secondary of the transformer 10 through the heater element 8, the heat control unit 20, through its operative connection to the control unit 12, being effective to control the pulse duration of each one half cycle of the alternating current fed to the heater element 8 and thereby control the rate of heating of the latter. During such a normal cycle of operation of the machine 1, the normally closed relay contacts R–2A are closed so that the potentiometer 24 is operatively connected to the heat control 20 for adjusting the heat control 20, and thereby adjust the pulse duration of each one half cycle of the alternating current flowing through the control unit 12 and the conductors 9, 11, and 13 to the heater element 8.

The potentiometer 23 affords a control for the heat timer 19 by which the time that the heat timer 19 remains in "on" condition may be adjusted to a suitable period of time, such as, for example, for 40 degrees rotation of the drive shaft 6 from the aforementioned 140 degree position thereof to the 180 degree position thereof. However, it will be understood by those skilled in the art that this particular time is for illustration purposes only and is not by way of limitation, and that the potentiometer 23 is capable of adjusting this time of operation of the heat timer 19 through a suitable range of time, such as, for example, from 20 degrees to 90 degrees rotation of the cam shaft 6.

When the timer 19 "runs out" or shuts off, at the completion of the time of operation thereof as determined by the setting of the potentiometer 23, it is effective to actuate the control unit 12 and thereby stop curent flow through the heater element 8. However, during the remaining portion of the single revolution of the drive shaft 6 the jaws 2 and 3 remain closed to thereby apply sealing pressure to the sheet material therebetween while the latter is cooling.

At the end of a complete revolution of the drive shaft 6 and the cam 5, the jaws 2 and 3 have again been returned to fully lowered position. At this time, the cam 36 has moved with the drive shaft 6 into position to again open the switch SW–2. Opening of the switch SW–2 deenergizes the relay R–1 and the solenoid valve SV–1. Deenergization of the relay R–1 opens the normally open contacts R–1A to thereby open the circuit through the switch SW–1 to the timer 19. Also, deenergization of the solenoid valve SV–1 disconnects the conduits 33 and 34 and again connects the conduits 33 and 35 to thereby actuate the air cylinder 7 and open the jaws 2 and 3. Opening of the jaws 2 and 3 permits the switch SW–1 to open, and the machine 1 is then in condition to commence another cycle of operation.

In the operation of the machine 1, the adjustment of the potentiometer must be so co-ordinated that during the time that current flows through the heater element 8 as determined by the setting of the potentiometer 23, the pulse duration of each one-half cycle of the alternating current which is conducted into the heater element 8, as determined by the setting of the potentiometer 24, is such that the heater element 8 is heated to the proper temperature for effecting heat sealing of the plastic material gripped between the jaws 2 and 3. Such a temperature is within a relatively narrow range such as, for example, from 420 to 430 degrees Fahrenheit, the suitable ranges of temperatures for different plastic materials varying with the materials and being relatively criticial. If the temperature to which the heater element is heated is too low, insufficient, or no plasticizing of the sheet material will occur for proper heatsealing. If the temperature to which the heater element 8 is heated is too high, excessive plasticizing of the sheet material will occur for proper heatsealing.

In the operation of the machine 1, after the heater 8 has been heated to its proper starting temperature, and the potentiometers 23 and 24 have been properly adjusted, the alternate cooling and heating of the heater element 8 during successive normal cycles of operation are such that the machine 1 is effective to properly seal a bag on each successive operation. However, machines of the type exemplified by the machine 1 shown in the drawings customarily embody control mechanism, either automatic or manual, not shown, which is effective to prevent energization of the solenoid valve SV-1 and, thereby, to prevent closing of the jaws 2 and 3 and afford a "skip" cycle operation of the machine wherein a bag is not sealed, if the filling machine is not ready to deliver product to the bag. During such a "skip" cycle of operation of machines known in the art prior to the present invention, inasmuch as the jaws 2 and 3 are not closed, the switch SW-1 is not closed, so that no current flows through the heater element 8 to heat the same, and, therefore, the heater element 8 is cooled for a prolonged period of time, and the temperature thereof falls to an excessively low temperature. Thus, it will be seen that during the next cycle of operation in which a bag sealing operation is attempted, the maximum temperature to which the heater element 8 is raised is lower than the desired temperature, and may be below the temperature necessary to effect a proper heatsealing operation. This excessive cooling of the jaws 2 and 3 is enhanced if machines of this general type pass through several successive "skip" cycles of operation. Heretofore, when such "skip" cycles of operation occurred it has not been unusual for it to be necessary for heatsealing machines heretofore known in the art to pass through several successive heatsealing operations, which were "normal" in every way except that improper sealing occurred, before the temperatures of the heater elements thereof were again raised to their normal ranges of operation.

It is an important object of the present invention to overcome such difficulties, and to insure that during operation of the machine 1 the temperature to which the heater element 8 is cooled at the start of a cycle of operation is the desired temperature, irrespective of whether the cycles of operation of the machine are normal cycles or "skip" cycles. For these purposes, the novel heat sealing machine 1 includes auxiliary heat controls which will now be discussed in greater detail.

The aforementioned auxiliary heat controls include the previously mentioned relay contacts R-2A and R-2B, and the potentiometer 25. In addition, they include a normally open switch SW-3, one side of which is connected through a conductor 37 to the one side 30 of the power source 14, and the other side of which is connected by a conductor 38 to one end of the winding of the relay R-2. The other end of the winding of the relay R-2 is connected by a conductor 39 to the other side 27 of the power source 14.

A cam 40 is mounted on the drive shaft 6 in position to control the opening and closing of the switch SW-3. The cam 40 is of such configuration that the switch SW-3 remains open for that portion of a cycle of operation of the machine 1 during which the cam shaft 6 rotates from its initial position through the maximum position at which the timer 19 would normally shut off in a normal operation of the machine. Thus, for example, in the machine 1 shown in the drawings, wherein the maximum position of the cam 5 at which the heat timer 19 may be shut off has been described as being 230 degrees, the cam 40 is of such configuration that it is ineffective to close the switch SW-3 until after the drive shaft 6 has completed more than 230 degrees of a single revolution. Thereafter, such as for example, at the completion of 240 degrees rotation of the drive shaft 6, the cam 40 is effective to close the normally open switch SW-3, and is effective to hold it in closed position for a predetermined period of time such as, for example, during 110 degrees rotation of the drive shaft 6.

Such closing of the switch SW-3 is effective to energize the relay R-2 to thereby open the normally closed relay contacts R-2A and close the normally open relay contacts R-2B, for a purpose which will be discussed in greater detail presently. Energization of the relay R-2 is also effective to close normally open contacts R-2C which are connected by conductors 41 and 42 to the conductors 15 and 18, respectively, in parallel to the relay contacts R-1A and the switch SW-1.

With this construction, if, during a cycle of operation of the machine 1, the jaws 2 and 3 have not closed, so that the switch SW-1 has not been closed, when the normally open contacts R-2C are closed by the closing of the switch SW-3 and the consequent energization of the relay R-2, a cycle of operation of the heat timer 19 is commenced, and inasmuch as the switch SW-3 is held closed by the cam 40 through more than a sufficient amount of rotation of the drive shaft 6 for a normal cycle of operation of the timer 19 to occur, the timer 19 is "on" for a full cycle of operation prior to the completion of the revolution of the drive shaft 6 back to its initial position. It will be seen that under these circumstances, if the one-half cycle duration of the alternating current flowing through the heater element 8 during such operation of the heat timer 19, were controlled by the potentiometer 24, as it is during a normal operation of the machine 1, the heater element 8 would be heated to an excessively high temperature, the normal heat drain from the heater element 8, such as, for example, the heat drain to the jaw 2 and to the sheet material to be sealed, being absent. However, in the novel heatsealing machine 1, during such a "skip" cycle of operation, the one-half cycle duration of the alternating current flowing through the heater element 8 is not controlled by the potentiometer 24, but is controlled by the potentiometer 25. This is effected by the opening of the normally closed relay contacts R-2A between the potentiometer 24 and the heat control unit 20, and closing of the normally open contacts R-2B between the potentiometer 25 and the heat control unit 20, caused by the energization of the relay 2. It will be remembered that closing of the switch SW-3 is effective to energize the relay R-2 and such energization of the relay R-2 is effective to open and close the contacts R-2A and R-2B, respectively.

Therefore, during a "skip" cycle of operation of the machine 1, the potentiometer 24 is disconnected from the heat control unit 20, and the potentiometer 25 is operatively connected to the heat control unit 20 during the entire time that the switch SW-3 is held closed by the cam 40, such as, for example, during rotation of the drive shaft 6 from its 240 degree position to its 350 degree position. The potentiometer 25 may be adjusted to a setting effective to so control the heat control unit 20 that the one-half cycle duration of the alternating current flowing through the heater element 8 during the time that the heat timer 19 is running during a "skip" cycle of operation of the machine 1, is such that it overcomes the excessive cooling effect on the heater element 8, which would otherwise occur during a skip cycle of operation, and sufficient heat is supplied to the heater element 8 that the temperature thereof at the 360 degree position of the drive shaft 6 is the same as it would be during a normal cycle of operation wherein the switch SW-1 had been closed by the closure of the jaws 2 and 3, and energization of a cycle of operation of the timer 19 had occurred at the 140 degree position of the drive shaft 6.

With the above-described auxiliary heat control, it will be seen that during a normal cycle of operation, wherein the switch SW–1 is closed by the closing of the jaws 2 and 3, the heat timer 19 operates during its normal time of operation, and the auxiliary heat control has no effect on the operation of the heat timer 19 or the heating of the heater element 8. This is because, during a normal cycle of operation of the machine 1, a cycle of operation of the heat timer 19 is commenced at the 140 degree position of the drive shaft 6, the relay contacts R–1A and the switch SW–1 having been closed at that time. Thereafter, the contacts R–1A and the switch SW–1 remain closed until the 360 degree position of rotation of the drive shaft 6. Therefore, at the 240 degree position of the drive shaft 6, when the switch SW–3 is closed, the heat timer 19 has already been energized, and has "run out," but the closing of the relay contacts R–2C at that time is ineffective to supply a new signal to the heat timer 19, because the relay contact R–1A and the switch SW–1 are still closed so that no new current flow to the heat timer 19 is effected. The energization of the relay R–2, caused by the closing of the switch SW–3, is effective to open the contacts R–2A and close the contacts R–2B, to thereby disconnect the potentiometer 24 from the heat control unit 20 and connect the potentiometer 25 to the heat control unit 20, respectively, but this is immaterial because the heat control unit 20 is not operating at that time, the heat timer 19 being "off."

In FIG. 2 a modified form of the present invention is shown wherein control of the heating of the heater element 8 is effected by controlling the voltage or amplitude of the current flowing therethrough rather than the phase control heretofore described with respect to the form of the invention illustrated in FIG. 1. Parts shown in FIG. 2 which are the same as parts shown in FIG. 1 are indicated by the same reference numerals, and parts which have been substituted for parts shown in FIG. 1 are indicated by the same reference numerals with a prime mark added thereto.

The differences between the apparatus shown in FIGS. 1 and 2 are primarily in the switch unit 12′ and the controls threfor. Thus, whereas the switching mechanism embodied in the switch unit 12, shown in FIG. 1, is preferably of the solid state type, the switching mechanism in the switch unit 12′, shown in FIG. 2, is of any suitable quick-acting type, such as, for example, gaseous state electron flow switches; the control unit 20 and the potentiometers 24 and 25, shown in FIG. 1, are eliminated; and two variable transformers 24′ and 25′ are added.

The variable transformer 24′, FIG. 2 is connected between the power lines 27 and 30 in such a manner as to control the voltage applied to the primary of the transformer 10, during a normal cycle of operation. The control unit 20 being eliminated in the apparatus shown in FIG. 2, the timer 19 is effective to supply a continuous control signal to the switch 12′ at all times during actuation of the timer 19. Thus in a normal cycle of operation of the apparatus shown in FIG. 2, the heater element 8 is heated at all times during actuation of the timer 19, the amplitude of the current flowing through the heater element 8, and, therefore, the intensity of the heat applied thereto, being controlled by the variable transformer 24′.

During such a normal cycle of operation of the apparatus shown in FIG. 2, the closing of the switch SW–3, and the consequent closing of the normally open relay contacts R–2B and connection of the variable transformer 25′, is ineffective to again energize the timer 19. the switch SW–1 and the relay contacts R–1A remaining closed.

However, it will be remembered that during a "skip" cycle of operation the switch SW–1 does not close so that the timer 19 is not energized through the relay contacts R–1A and the switch SW–1. Therefore, when the switch SW–3 is closed by the cam 40, to thereby close the relay contacts R–2B and R–2C, current flow from the switch unit 12′, through the relay contacts R–2C to the timer 19 is effective to energize the latter for a full cycle of operation. However, the energization of the relay R–2 is effective to open the relay contacts R–2A, to thereby disconnect the variable transformer 24′ from the transformer 10; and to close the relay contacts R–2B, to thereby connect the variable transformer 25′ to the transformer 10. The transformer 25′ in the apparatus shown in FIG. 2 is so adjusted that the power applied therethrough to the transformer 10, during a skip cycle of operation is just sufficient to afford the heat necessary to maintain the temperature of the heater element 8 at the desired temperature.

From the foregoing, it will be seen that the present invention affords a novel heatsealing machine wherein the temperature of the heater element thereof is maintained within a predetermined range in a novel and expeditious manner.

Also, it will be seen that such maintenance of the temperature of the heating element is accomplished in the machine irrespective of whether the machine passes through a "skip" cycle operation or a normal heatsealing cycle of operation.

In addition, it will be seen that the present invention affords a novel heatsealing machine wherein adjustment of the normal heating and auxiliary heating of the heater element may be effected independently of each other and in a novel and expeditious manner.

Also, it will be seen that the present invention affords a novel machine of the aforementioned type which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A machine for heatsealing thermoplastic sheets and having sealing cycles and skip cycles of operation, said machine comprising
 (a) means for applying pressure to such sheets,
 (b) said means including
  (1) a pair of pressure jaws movable during sealing cycles of said machine between
   (a′) one position effective to clamp such sheets therebetween, and
   (b′) another position wherein said jaws are spaced from each other and ineffective to clamp said sheets therebetween,
 (c) said jaws remaining in said skip position during other cycles of operation of said machine,
 (d) a heater element mounted on one of said jaws in position to engage the portion of said sheets disposed between said jaws when said jaws are disposed in said one position,
 (e) means for heating said heater element to a predetermined temperature during each of said sealing cycles of operation, and
 (f) means for heating said heater element to a lower temperature than said first-mentioned temperature during each of said skip cycles of operation.

2. A machine for heatsealing thermoplastic sheets comprising
 (a) drive means movable through a plurality of successive cycles of operation,
 (b) means operatively connected to said drive means for applying pressure to such sheets,
 (c) heating means operatively connected to said pressure applying means for applying heat to said sheets when pressure is applied thereto by said pressure applying means, and
 (d) means for controlling the temperature of said heating means, (e) said temperature controlling means including means operatively connected to said pressure applying means and to said heating means for
(1) heating said heating means a predetermined amount during each said cycle of operation wherein pressure is applied to such sheets by said pressure applying means, and
(2) heating said heating means an amount lesser than said predetermined amount during each said cycle of operation wherein pressure is not applied to such sheets by said pressure applying means.

3. A machine as defined in claim 2, and in which
(a) said temperature controlling means includes
(1) timer means operatively connected to said heating means,
(2) means for actuating said timer at one portion of each said cycle wherein said pressure is applied, and
(3) means for actuating said timer at another portion of each said cycle when said pressure is not applied.

4. A machine as defined in claim 2, and in which
(a) said heating means includes an electrically conducting directly heated heater element, and
(b) said temperature controlling means includes
(1) means for feeding alternating current to said heater element,
(2) means operatively connected to said last-mentioned means for controlling what phase of each one-half cycle of alternating current being fed into said heater element is allowed to be conducted into said heater element,
(3) two potentiometers for controlling the operation of said one-half cycle phase controlling means, and
(4) means, including a switch controlled by said drive means, for selectively connecting said potentiometers to said one-half cycle phase controlling means during respective portions of each said cycle of operation.

5. A machine as defined in claim 2, and in which
(a) said heating means includes an electrically conducting directly heated heater element, and
(b) said temperature controlling means includes
(1) means for feeding alternating current to said heater element,
(2) means operatively connected to said last-mentioned means for controlling the voltage of said current,
(3) two variable transformers for controlling the operation of said voltage controlling means, and
(4) means, including a switch controlled by said drive means, for selectively connecting said variable transformers to said voltage controlling means during respective portions of each said cycle of operation.

6. A machine as defined in claim 2, and in which
(a) said heating means includes an electrically conducting directly heated heater element, and
(b) said temperature controlling means includes
(1) means for feeding alternating current to said heater element,
(2) means operatively connected to said last-mentioned means for controlling the feeding of said current to said heater element,
(3) said controlling means including
(a') switch means in said feeding means,
(b') a control unit operatively connected to said feeding means for controlling what phase of each one-half cycle of alternating current being fed into said heater element is allowed to be conducted into said heater element,
(c') a timer operatively connected to said switch means and said control unit for controlling the operation thereof,
(d') means, including a switch controlled by said drive means, for actuating said timer at one portion of each said cycle wherein said pressure is applied,
(e') means, including another switch controlled by said drive means, for actuating said timer at another portion of each said cycle wherein said pressure is not applied,
(f') two potentiometers for controlling the phase length of each one-half cycle of alternating current being fed into said heater element, and
(g') means, including said other switch, for operatively connecting said control unit
(1') to one of said potentiometers during said one portion of each cycle, and
(2') to the other of said potentiometers during said other portion of each cycle.

7. A machine as defined in claim 2, and in which
(a) said heating means includes an electrically conducting directly heated heater element, and
(b) said temperature controlling means includes
(1) means for feeding alternating current to said heater element,
(2) means operatively connected to said last-mentioned means for controlling the feeding of said current to said heater element,
(3) said controlling means including
(a') switch means in said feeding means,
(b') a control unit operatively connected to said feeding means for controlling the amplitude of said current,
(c') a timer operatively connected to said switch means and said control unit for controlling the operation thereof,
(d') means, including a switch controlled by said drive means, for actuating said timer at one portion of each said cycle wherein said pressure is applied,
(e') means, including another switch controlled by said drive means, for actuating said timer at another portion of each said cycle wherein said pressure is not applied,
(f') two variable transformers for controlling the operation of said control unit during operation of said timer, and
(g') means, including said other switch, for operatively connecting said control unit
(1') to one of said variable transformers during said one portion of each cycle, and
(2') to the other of said variable transformers during said other portion of each cycle.

8. In a machine for heatsealing thermoplastic sheets embodying a pair of jaws movable to a closed position effective to clamp such sheets therebetween and an open position ineffective to clamp such sheets therebetween, an electrically conductive directly heated heater element for heating the portion of such sheets so clamped between said jaws, and drive mechanism operatively connected to said jaws and movable through successive cycles of operation, and wherein said jaws normally move from said open position to said closed position and back to said open position during each said cycle of operation, but remain in said open position during certain of said cycles of operation,
(a) means operatively connected to said drive mechanism for feeding electric current to said heater element and heating said element to heat sealing temperatures during a predetermined period during each said cycle of operation in which said jaws are closed, and (b) means operatively connected to said drive mechanism for feeding electric current to said heater element and heating said element to temperatures lower than said first-mentioned temperatures during a predetermined period during each said cycle of operation in which said jaws remain open.

9. The combination as defined in claim 8, and in which
(a) said first-mentioned means includes
(1) a timer for determining the length of said periods for feeding said current, and
(2) switch means operatively connected to said timer and to said jaws for starting said timer when said jaws move into closed position, and
(b) said second-mentioned means includes switch means operatively connected to said timer and to said drive mechanism for starting said timer during each cycle of operation in which said jaws remain open.

10. The combination as defined in claim 8, and
(a) which includes means in both said first-mentioned means and said second-mentioned means for controlling the voltage at which said current flows through said heater element, and
(b) in which
(1) said first-mentioned means includes a variable transformer operatively connected to said third-mentioned means and said second-mentioned means for determining said voltage during said first-mentioned cycles of operation, and
(2) said second-mentioned means includes a variable transformer operatively connected to said third-mentioned means for determining said voltage during said second-mentioned cycles of operation.

11. The combination as defined in claim 8, and
(a) in which said electric current is alternating current,
(b) which includes means in both said first-mentioned means and said second-mentioned means for controlling the phase length of each one-half cycle of alternating current being fed into said heater element, and
(c) in which
(1) said first-mentioned means includes a potentiometer operatively connected to said third-mentioned means and said second-mentioned means for determining said one-half cycle phase length during said first-mentioned cycles of operation, and
(2) said second-mentioned means includes a potentiometer operatively connected to said third-mentioned means for determining said one-half cycle phase length during said second-mentioned cycles of operation.

12. The combination as defined in claim 8, and in which
(a) said first-mentioned means includes
(1) switch means operatively connected to said heater element for permitting and preventing feeding of said current to said heater element,
(2) a timer for controlling the operation of said switch means, and
(3) a switch operatively connected to said timer and actuated by said jaws when said jaws close for feeding electric current to said timer,
(b) said timer operates for a predetermined period from the initiation of feeding said current thereto, and
(c) said second-mentioned means includes means, including other switch means operatively connected to said timer and actuated by said drive mechanism, for feeding said current to said timer during said second-mentioned cycles of operation.

13. The combination as defined in claim 12, and in which
(a) said other switch means are actuated by said drive mechanism for affording a connection between said timer and a source of said last-mentioned current during each cycle of operation of said drive mechanism.

14. The combination as defined in claim 13, and in which
(a) said other switch means are so actuated during said first-mentioned cycles of operation
(1) after said first-mentioned predetermined period, and
(2) prior to discontinuance of said feeding of current to said timer through said first-mentioned switch.

References Cited

UNITED STATES PATENTS

| | | | |
|---|---|---|---|
| 2,630,396 | 3/1953 | Langer | 219—243 X |
| 2,874,751 | 2/1959 | Norton | 100—93 |
| 2,908,320 | 10/1959 | Rohdin | 100—93 |
| 3,005,402 | 10/1961 | Starger et al. | 100—93 |
| 3,008,028 | 11/1961 | Christensson | 100—93 |
| 3,029,178 | 4/1962 | Carver | 100—93 X |
| 3,113,198 | 12/1963 | Shinn | 156—583 X |
| 3,133,390 | 5/1964 | Leasure et al. | 53—180 |
| 3,148,269 | 9/1964 | Hartesveldt et al. | 219—243 |
| 3,165,622 | 1/1965 | Marzec | 100—93 X |
| 3,272,114 | 9/1966 | Rakel | 100—93 |

FOREIGN PATENTS 849,074  9/1960  Great Britain.

BILLY J. WILHITE, *Primary Examiner.*

UNITED STATES PATENT OFFICE
CERTIFICATE OF CORRECTION

Patent No. 3,348,474                      October 24, 1967

Norman A. Virta et al.

It is certified that error appears in the above identified patent and that said Letters Patent are hereby corrected as shown below:

Column 10, line 51, "skip" should read -- other --; line 52, "other" should read -- skip --.

Signed and sealed this 9th day of December 1969.

(SEAL)
Attest:

Edward M. Fletcher, Jr.                      WILLIAM E. SCHUYLER, JR.
Attesting Officer                                Commissioner of Patents